United States Patent
Knecht

Patent Number: 5,530,217
Date of Patent: Jun. 25, 1996

[54] ELECTRICAL DISCHARGE MACHINING APPARATUS FOR WORKPIECES MOUNTED ON PALLETS

[75] Inventor: Hans Knecht, Reutlingen-Mittelstadt, Germany

[73] Assignee: Exeron Erodiertechnologie GmbH, Germany

[21] Appl. No.: 304,131

[22] Filed: Sep. 12, 1994

[30] Foreign Application Priority Data

Sep. 13, 1993 [DE] Germany ............... 43 30 885.6

[51] Int. Cl.⁶ .................................. B23H 1/00
[52] U.S. Cl. .................... 219/69.11; 219/69.15
[58] Field of Search ................ 219/69.11, 69.14, 219/69.15, 69.17; 198/346.1

[56] References Cited

U.S. PATENT DOCUMENTS

| | | | |
|---|---|---|---|
| 4,563,800 | 1/1986 | Bonga | 219/69.11 |
| 4,626,645 | 12/1986 | Inoue et al. | 219/69.17 |
| 4,764,653 | 8/1988 | Bühler | 219/69.15 |
| 4,797,052 | 1/1989 | Ohta et al. | 198/346.1 |
| 4,853,512 | 8/1989 | Scheider | 219/69.15 |
| 5,038,012 | 8/1991 | Walter | 219/69.15 |
| 5,044,486 | 9/1991 | Kitamura | 198/346.1 |
| 5,091,622 | 2/1992 | Ohba | 219/69.15 |
| 5,270,512 | 12/1993 | Onandia | 219/69.11 |
| 5,401,931 | 3/1995 | Hori | 219/69.11 |

FOREIGN PATENT DOCUMENTS

| | | |
|---|---|---|
| 0217188 | 4/1987 | European Pat. Off. |
| 0283430 | 9/1988 | European Pat. Off. |
| 3326416 | 2/1984 | Germany ............ 219/69.17 |
| 3720180 | 6/1988 | Germany. |
| 4116104 | 12/1992 | Germany. |
| 4116103 | 2/1993 | Germany. |
| 4241708 | 6/1993 | Germany. |
| 0667409 | 10/1988 | Switzerland. |

OTHER PUBLICATIONS

Patent Abstracts of Japan, vol. 6, No. 20 (M–110)(898) Feb. 5, 1982.
Catalog SD 3592, "System H for Perpendicular Erosion Machines", No Publication Date.

*Primary Examiner*—Geoffrey S. Evans
*Attorney, Agent, or Firm*—Dominik & Stein

[57] ABSTRACT

An electrical discharge machining apparatus including a workhead (10), which is transportable sideways out of a work area defined by a setup plate (23). The workhead (10) includes a chuck (11), which is adapted not only for the carrying of an electrode (110) for the processing of a workpiece mounted on a pallet (100), but also for carrying a transport gripper (120). The transport gripper (120) serves to grab the pallets (100) and to deliver these or as the case may be, to remove these from the work area (23). The electrodes (110) and the pallets (100) are magazined on a plate changer (30), which is integrated in the machine bed immediately adjacent to the work area (23). The normally provided CNC-controller (40) must only be modified slightly, so that the workhead (10) serves not only for the processing, but also for the changing out of electrodes (110) and pallets (100). The until now conventional, separate robot can thus be completely dispensed with. Further, there is achieved an exceptionally compact type of construction.

4 Claims, 2 Drawing Sheets

ELECTRICAL DISCHARGE MACHINING APPARATUS FOR WORKPIECES MOUNTED ON PALLETS

BACKGROUND OF THE INVENTION

1. Field of the Invention

The present invention relates to an electrical discharge machining apparatus, and more particularly to an electrical discharge machining apparatus wherein, with slight modification of the CNC controller, the workhead can serve not only for the processing of a workpiece, but additionally can perform the changing out of the electrode and work-piece carrying pallet. The invention makes possible the dispensing of the conventionally required robot.

2. Description of the Related Art

An electrical discharge machining apparatus is used in the processing of work pieces, which are mounted on pallets. For this, a workhead is mounted on guideways and is displaceable in all three coordinate directions, that is, in the X-, Y- and Z-directions, by means of a computer numerical control (CNC)-controller. Below the workhead there is to be found a work area, which is essentially defined by a setup plate. On the setup plate an automatic chuck is provided, which secures the pallet with its thereupon mounted workpieces during the work processing. The setup plate inclusive of the chuck is situated in a container, which contains the dielectric. The respective sub-elements of the electrical discharge machining apparatus are received on a machine bed, in which a filter device for the dielectric is also integrated.

With the help of the CNC controller it is possible to convey an exchangeable electrode, which is mountable on the workhead or, as the case may be, the spindle, exactly into position with respect to the workpiece to be processed. The delivery and removal of the workpiece pallets and the electrodes occurs by means of a robot, which is provided next to the electrical discharge machining apparatus. The robot can, by means of a gripper mounted on a gripper arm, on the one hand, grasp an electrode which is available from a magazine and bring this to the workhead. For this an automatic chuck is provided on the workhead, so that the electrode is grasped and held. On the other hand, the robot services a further magazine, in which workpiece-covered pallets are supplied. The gripper grabs this pallet and brings this to the work area. There the pallet is secured by means of an automatic chuck. During the work processing process, the gripper arm of the robot is removed from the work area and the workhead erodes the desired contour according to the control program.

The disadvantage of this type of electrical discharge machining apparatus is comprised therein, that it is very expensive. This concerns not only the electrical discharge machining apparatus itself, but rather in particular the networking with the robot, which accomplishes the necessary delivery and removal of electrodes and pallets.

SUMMARY OF THE INVENTION

The invention is thus particularly concerned with the problem of further developing the electrical discharge machining apparatus of the type discussed above, so that the above-mentioned problems no longer occur.

This problem is solved by means of an electrical discharge machining apparatus wherein, with slight modification of the CNC controller, the workhead can serve not only for the processing of a workpiece, but additionally can perform the changing out of the electrode and work-piece carrying pallet.

The electrical discharge machining apparatus according to the invention includes a workhead, which is transportable sideways out of a work area defined by a setup plate. The workhead includes a chuck, which is adapted not only for the carrying of an electrode for the processing of a wokpiece mounted on a pallet, but also for carrying a transport gripper. The transport gripper serves to grab the pallets and to deliver these or as the case may be, to remove these from the work area. The electrodes and the pallets are magazined on a plate changer, which is integrated in the machine bed immediately adjacent to the work area. The normally provided CNC-controller must only be modified slightly, so that the workhead serves not only for the processing, but also for the changing out of electrodes and pallets. The until now conventional, independent robot can thus be completely dispensed with.

Further, there is achieved an exceptionally compact type of construction. Advantageous embodiments of the invention can be seen from the features set forth in the dependent claims.

The advantage of the electrical discharge machining apparatus according to the invention resides therein, that the required CNC controller is only slightly modified, so that the workhead can serve not only for the processing of the workpiece, but also at the same time can perform the electrode and pallet change-out.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other automobile cover devices for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the present invention reference should be made the following detailed description taken in with the accompanying drawings in which.

DETAILED DESCRIPTION OF THE INVENTION

Figure 1:
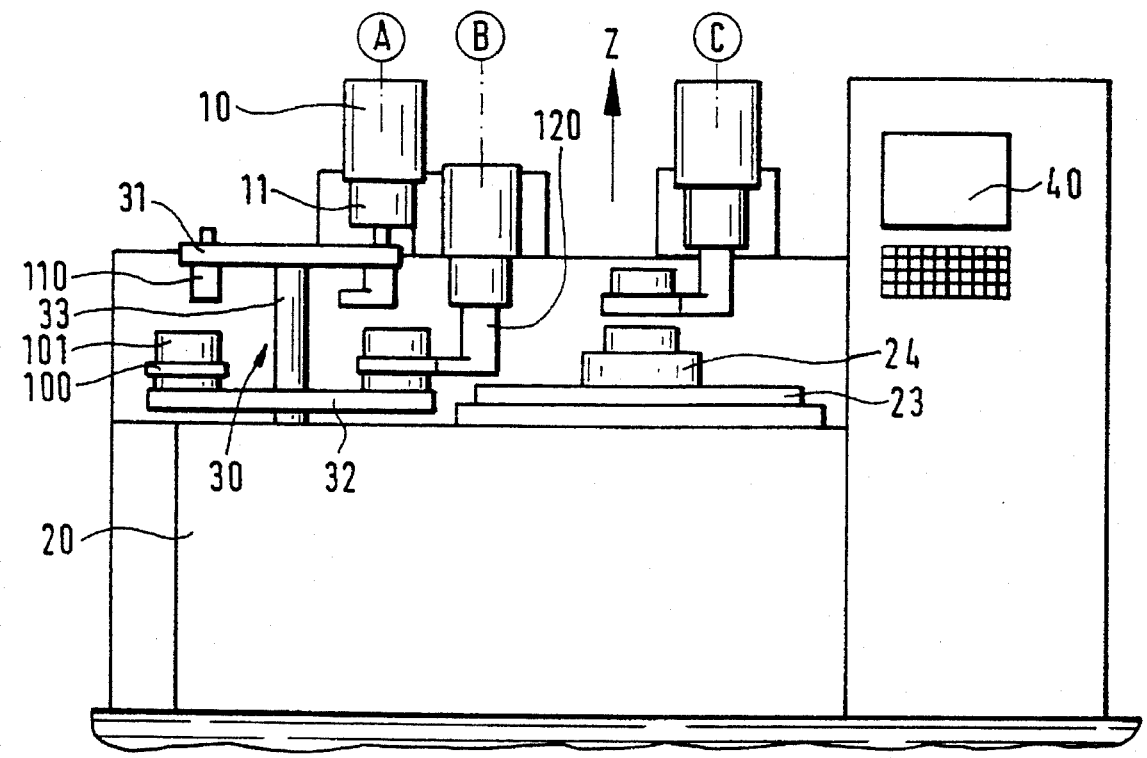
FIG. 1 shows an electrical discharge machining apparatus in side view.
Figure 1A:
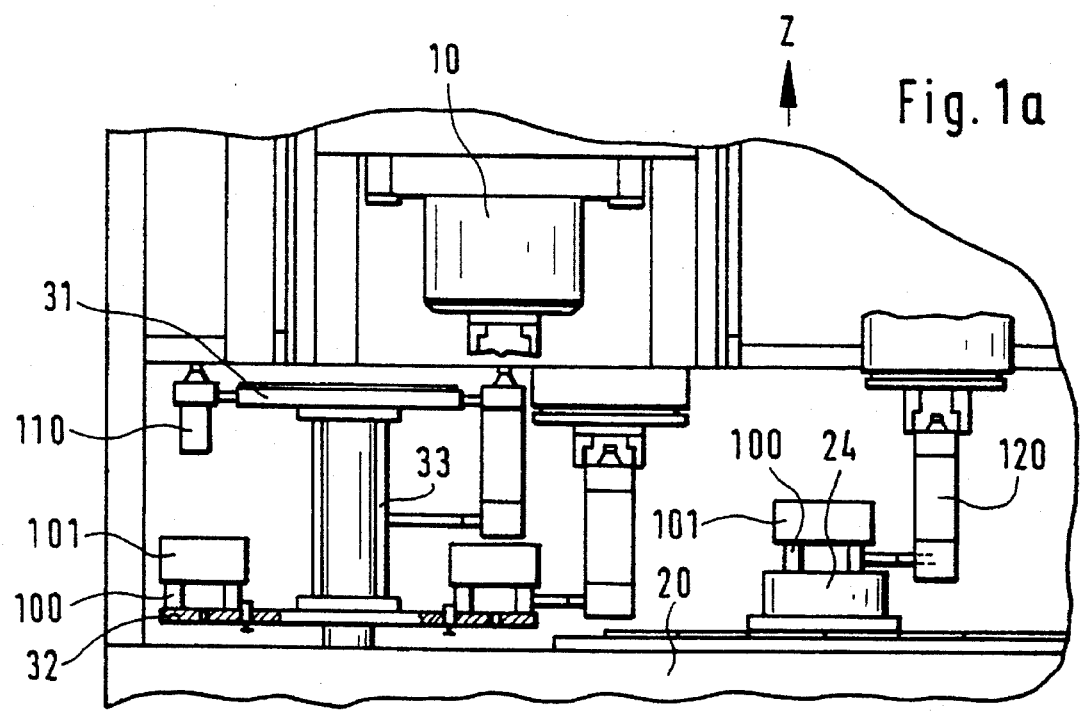
FIG. 1a shows an enlarged detail.

In a preferred embodiment the guideways for the horizontal running X-direction are extended sideways beyond the work area. In the area of the extended guideways, there is provided immediately adjacent to the work area a plate changer, which includes two turntables which are arranged co-axially, superposed, mounted on a common axle mounted turntables. One of the two turntables receives the electrodes, the other of the two turntables receives the pallets. Now it is possible to service the turntables with the workhead or, as the case may be, the work spindle. In order to complete the different tasks, the workhead is equipped with a transport gripper, which can be brought into association with the automatic chuck for the electrodes. The transport gripper is normally to be found in the rest position of the respective turntable which is holding the electrodes. For exchange of the pallet the workhead is moved to a transfer station of the turntables and deposits the electrode. Thereafter, it takes up the transport gripper and grabs a pallet which is provided for exchange. The pallet is brought to the desired position, or as the case may be, is brought into the work area for processing and is mounted on the chuck. Now the workhead is brought back to the turntable and exchanges the no-longer required transport gripper for the electrode necessary for the processing.

In this manner, it is possible to configure the electrical discharge machining apparatus with minimal modifications, so that a robot can be completely dispensed with. A further advantage lies therein, that the machine bed need only relatively minimally be increased in size, in order to receive the magazine for the electrodes and the pallets. This makes possible an exceptionally space-saving and compact type of construction.

According to a preferred embodiment, a catch basin is integrated in the machine bed, which catch basin is positioned underneath the turntable and catches dielectric material dripping off from the processed workpieces and which leads to the above-mentioned filter device. This is a significant advantage for an ecological conception of the processing unit of this type.

According to a further, preferred embodiment, the dielectric container is lowerable in the machine bed, so that the turntable is particularly easily accessible and the machine is capable of being constructed with a relatively low height.

The electrical discharge machining apparatus comprises a machine bed 20, which receives the integrated respective subcomponents. In respect to the machine bed 20, the two coordinate directions X and Y run horizontally, and the Z-direction runs vertically.

In the machine bed 20 there a lowerable container 21 is provided, which is filled with dielectric 22. Within the container 21 there is to be found a clamp or setup plate 23 with a chuck 24, which is constructed for receiving a workpiece 101 carrying pallet 100. The area of the setup plate 23 is the actual work area, which can be traversed by a workhead 10. The workhead 10 carries a chuck 11, which is adapted for receiving the electrode 110. The chuck 11 can alternatively also receive a transport gripper 120, which can grip a pallet 100.

Figure 2:
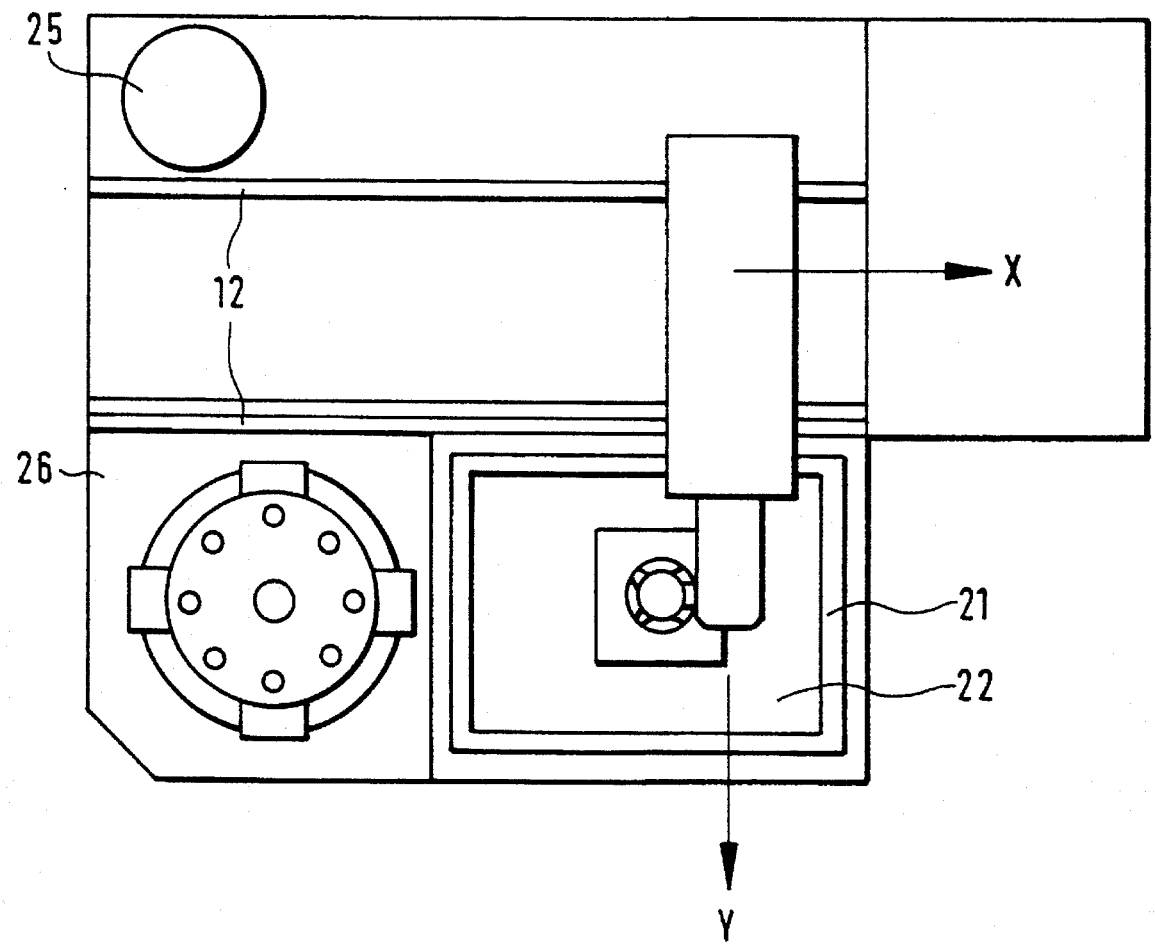
FIG. 2 shows an electrical discharge machining apparatus according to FIG. 1 in top view.

The workhead 10 is provided on guideways, which permit a displacement in all three coordinate directions. According to FIG. 2, guideways 12 are provided for the displacement in the X-direction. The guideways 12 traverse not only the work area 23, which is necessary for purposes of the processing of the workpiece 101, but rather are constructed extend towards the left in the representation according to FIG. 2. As a result thereof, it is possible to transport the workhead 10 out of the work area 23.

Outside of the work area 23, and immediately adjacent thereto, a plate changer 30 is provided. This comprises a turntable 31 and a turntable 32, which are provided co-axially spaced apart on a vertical plane. The turntable 31 carries the electrode 110 and the turntable 32, the pallet 100. The axle 33 and therewith the plate changer 30 are driven rotatably according to the program, so that the plate changer 30 with respect to its angular orientation can be exactly positioned.

Below the plate changer 30 there is provided a catch basin 26 provided, which is integrated in the machine bed 20 and coupled with the filter device 25 for the dielectric 22. This makes possible a reliable recovery of the dielectric dripping off of the plate changer 30 or more particularly dripping off the finished processed workpieces.

In FIG. 1, the various positions A, B, C of the workhead 10 are indicated.

In the position A, the workhead 10 is in a receiving or replacing position for the transport gripper 20 which is provided on the plate changer 30.

The position B characterizes the reception or replacement position for the pallet 100. This can on the one hand be a reception position for the workpiece to be processed 101 or, on the other hand, a return position for a finished processed workpiece 101.

Finally, position C shows the receiving position for the pallet 100 at the beginning or as the case may be the end of the processing procedure.

Not shown here is the position of the workhead 10 during the actual processing of the workpiece 101. Then the transport gripper 120 is exchanged for the electrode 110 and exactly aligned with the workpiece 101 and subsequently guided.

The present invention thus provides an improved electrical discharge machining apparatus which makes possible the dispensing of the expensive conventionally required robot, and overcomes the disadvantages of the prior art. It will be readily apparent that the system is capable of application to related apparatus, and is thus capable of use in a number of other applications. Although this invention has been described in its preferred form with a certain degree of particularity with respect to an electrical discharge machining apparatus, it is understood that the present disclosure of the preferred form has been made only by way of example and that numerous changes in the details of structures and the composition of the system may be resorted to without departing from the spirit and scope of the invention.

Now that the invention has been described,
What is claimed is:

1. An electrical discharge machining apparatus which uses an electrode to process workpieces mounted on pallets, said apparatus comprising:

a container containing dielectric;

a filter system for said dielectric integrated in a machine bed;

a workhead mounted on guideways (12) and transportable on said guideways using a CNC-controller in all three coordinate directions, said workhead provided with an automatic chuck (11) adapted to alternately receive an electrode (110) for electrical discharge machining of workpieces and a transport gripper (120) for gripping and transporting pallets (100);

a setup plate defining a work area, said setup plate provided with a pallet receiving automatic chuck (24) adapted for receiving and securely holding a pallet on which the workpieces to be processed are mounted, said setup plate and automatic chuck situated underneath the workhead in the container containing dielectric; and a machine bed for receiving assembled subcomponents;

wherein the CNC-controller (40) is programmed with a program for controlling the workhead (10) to process the workpieces (101) and also to change the electrode (110) and the pallets (100), and wherein the guideways (12) extend sideways beyond the work area (23) in at least one of two horizontal running directions (X; Y).

2. An electrical discharge machining apparatus according to claim 1, wherein said CNC-controller is programmed to control said container (21) to be lowered during the changing of the pallets (100) and/or electrodes (110).

3. An electrical discharge machining apparatus according to claim 1, wherein a catch basin (26) is integrated in the machine bed (20) below the plate changer (30).

4. An electrical discharge machining apparatus which uses an electrode to process workpieces mounted on pallets, said apparatus comprising:

- a container containing dielectric;
- a filter system for said dielectric integrated in a machine bed;
- a workhead mounted on guideways (12) and transportable on said guideways using a CNC-controller in all three coordinate directions, said workhead provided with an automatic chuck (11) adapted to alternately receive an electrode (110) for electrical discharge machining of workpieces and a transport gripper (120) for gripping and transporting pallets (100);
- a setup plate defining a work area, said setup plate provided with a pallet receiving automatic chuck (24) adapted for receiving and securely holding a pallet on which the workpieces to be processed are mounted, said setup plate and automatic chuck situated underneath the workhead in the container containing dielectric; and
- a machine bed for receiving assembled subcomponents;

wherein the CNC-controller (40) is programmed with a program for controlling the workhead (10) to process the workpieces (101) and also to change the electrode (110) and the pallets (100), wherein:

the guideways (12) extend sideways beyond the work area (23) in at least one of two horizontal running directions (X; Y); and further comprising a plate changer (30) for servicing the workhead (10) is arranged immediately adjacent to the work area (23) in the machine bed (20), wherein the plate changer (30) is comprised of two turntables (31, 32) mounted co-axially, one above the other, on a common axle (33), of which one turntable (31) is adapted for receiving an electrode (110) and the transport gripper (120) and the other turntable (32) is adapted for receiving pallets (100), and wherein said axle (33) is rotatably positionable under control of the CNC-controller (40).

\* \* \* \* \*